US010554171B2

(12) United States Patent
Gostein et al.

(10) Patent No.: US 10,554,171 B2
(45) Date of Patent: Feb. 4, 2020

(54) SOILING MEASUREMENT DEVICE FOR PHOTOVOLTAIC ARRAYS

(71) Applicants: Michael Gostein, Austin, TX (US); William Stueve, Austin, TX (US)

(72) Inventors: Michael Gostein, Austin, TX (US); William Stueve, Austin, TX (US)

(*) Notice: Subject to any disclaimer, the term of this patent is extended or adjusted under 35 U.S.C. 154(b) by 312 days.

(21) Appl. No.: 15/495,275

(22) Filed: Apr. 24, 2017

(65) Prior Publication Data
US 2017/0338771 A1    Nov. 23, 2017

Related U.S. Application Data

(60) Provisional application No. 62/340,026, filed on May 23, 2016.

(51) Int. Cl.
*H02S 40/10*    (2014.01)
*H02S 50/15*    (2014.01)
(52) U.S. Cl.
CPC ............ *H02S 50/15* (2014.12); *H02S 40/10* (2014.12)
(58) Field of Classification Search
CPC .................................. H02S 50/15; H02S 40/01
See application file for complete search history.

(56) References Cited

U.S. PATENT DOCUMENTS

| | | | |
|---|---|---|---|
| 8,905,458 B2* | 12/2014 | Pipp | B60K 15/05 141/348 |
| 8,951,356 B2 | 2/2015 | Fisher | |
| 9,564,853 B2 | 2/2017 | Gostein | |
| 2013/0085729 A1* | 4/2013 | Tsuruta | G06F 17/5009 703/2 |
| 2013/0146576 A1* | 6/2013 | Khan | H01L 31/048 219/201 |
| 2014/0375343 A1* | 12/2014 | Chen | G01K 13/00 324/750.02 |
| 2017/0104451 A1 | 4/2017 | Gostein | |
| 2017/0141577 A1* | 5/2017 | West | H02J 3/383 |
| 2017/0194897 A1 | 7/2017 | Lopez | |

* cited by examiner

*Primary Examiner* — Patrick Assouad
*Assistant Examiner* — Feba Pothen

(57) ABSTRACT

A soiling measurement device for PV arrays, comprising a clean PV device and a soiled PV device, wherein the soiled PV device is exposed to accumulate soiling, and wherein the clean PV device is maintained clean by a movable cover which normally shields it from accumulation of soiling, and wherein the movable cover opens automatically at periodic intervals for measurement, after which it closes again, and wherein soiling is determined by comparison of measurements from the soiled PV device and the clean PV device. In one embodiment, incident irradiance is measured from the clean device, with or without the presence of the soiled PV device.

13 Claims, 3 Drawing Sheets

SOILING MEASUREMENT DEVICE FOR PHOTOVOLTAIC ARRAYS

CROSS-REFERENCE TO RELATED APPLICATION

This application claims the benefit of U.S. Provisional Application No. 62/340,026, filed May 23, 2016.

FIELD OF THE INVENTION

The present invention is directed to the measurement of dust, dirt, and other contaminants, collectively known as "soiling," on photovoltaic arrays.

BACKGROUND

Solar panels, also known as photovoltaic (PV) modules, are increasingly being used for electric power generation, in applications ranging from residential to utility-scale installations. Such installations are known as PV arrays. The accumulation of dust, dirt, and other contaminants, collectively known as soiling, on PV arrays reduces their power output by blocking light transmission to the PV devices. Soiling can be a significant loss factor, especially in dusty regions without frequent rainfall. Soiling losses are variable and depend on weather conditions; therefore they must be determined at each installation site.

Owners and operators of PV arrays often wish to measure their power loss due to soiling. Motivations include pre-construction site surveys to estimate the impact of soiling on the performance of a planned PV array project, validation of as-built PV array performance compared to predictions and contractual performance guarantees, and optimization of PV module wash schedules at operating sites in order to yield greatest return on investment for the expense of washing.

A number of systems have been developed for the measurement of soiling losses on PV arrays. These systems involve, in various forms, comparing the output of two PV reference devices, one of which is kept clean (the "clean PV device"), and the other of which is allowed to accumulate soiling at the same rate as the PV array (the "soiled PV device"). By comparing the electrical output of the soiled PV device to expectations based on the clean PV device, the degree of power loss due to soiling can be estimated.

In existing systems, the clean PV device is maintained clean either manually, by operations and maintenance personnel, or automatically, by equipment using a water spray or other cleaning action.

However, both the manual and automatic cleaning methods have an impact on cost of ownership. Manual cleaning requires a labor expense, which may be significant considering that cleaning should ideally be performed daily in order to obtain the best measurements. Automatic systems minimize the labor expense, but incur a capital expense.

Both automatic and manual cleaning approaches for soiling measurement systems may be practical at large utility-scale installations, where labor and/or capital expenses are typically warranted, but the expense of such systems limits their utilization. Furthermore, the systems are less practical at smaller installations, including large roof-top commercial-scale PV arrays, which cannot afford dedicated labor or equipment capital expense.

Therefore, there is a need for an improved soiling measurement device that is less expensive to deploy and maintain and is suitable for a larger range of installation types.

SUMMARY

It is an object of the present invention to provide a soiling measurement device that does not require frequent cleaning.

In one embodiment of the invention, a soiling measurement device includes a clean PV device and a soiled PV device, wherein the clean PV device is maintained clean by a movable cover which normally shields it from accumulation of soiling, and wherein the movable cover opens automatically at periodic intervals for measurement, after which it closes again.

DETAILED DESCRIPTION OF THE INVENTION

In one embodiment, the invention consists of a soiling sensor head (130) and a separate measurement and control enclosure (306).

Figure 1:
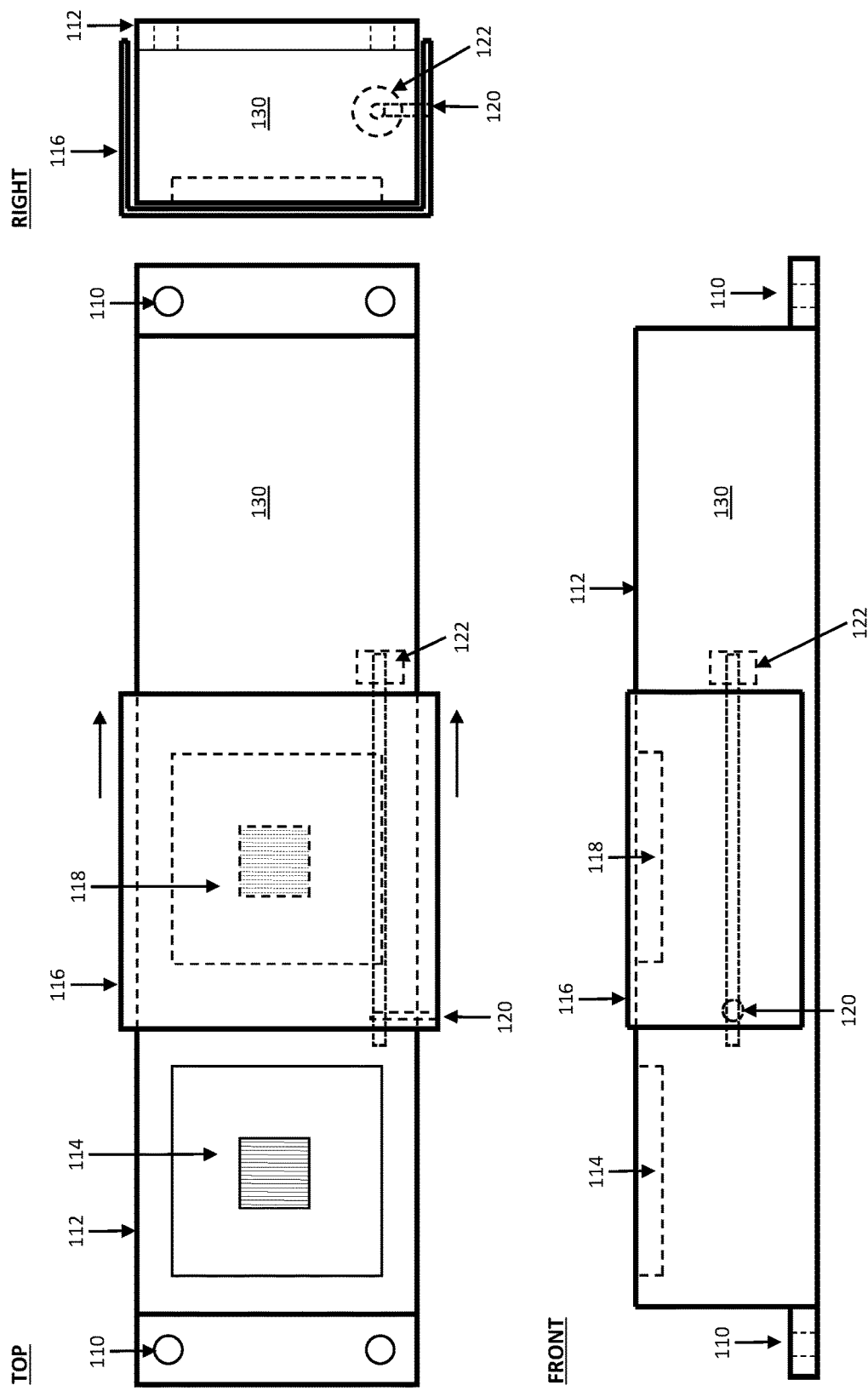
FIG. 1 depicts the soiling sensor head (130) of one embodiment of a soiling measurement device according to the present invention, in a configuration in which the movable cover (116) is closed, protecting the clean PV device (118).
Figure 2:
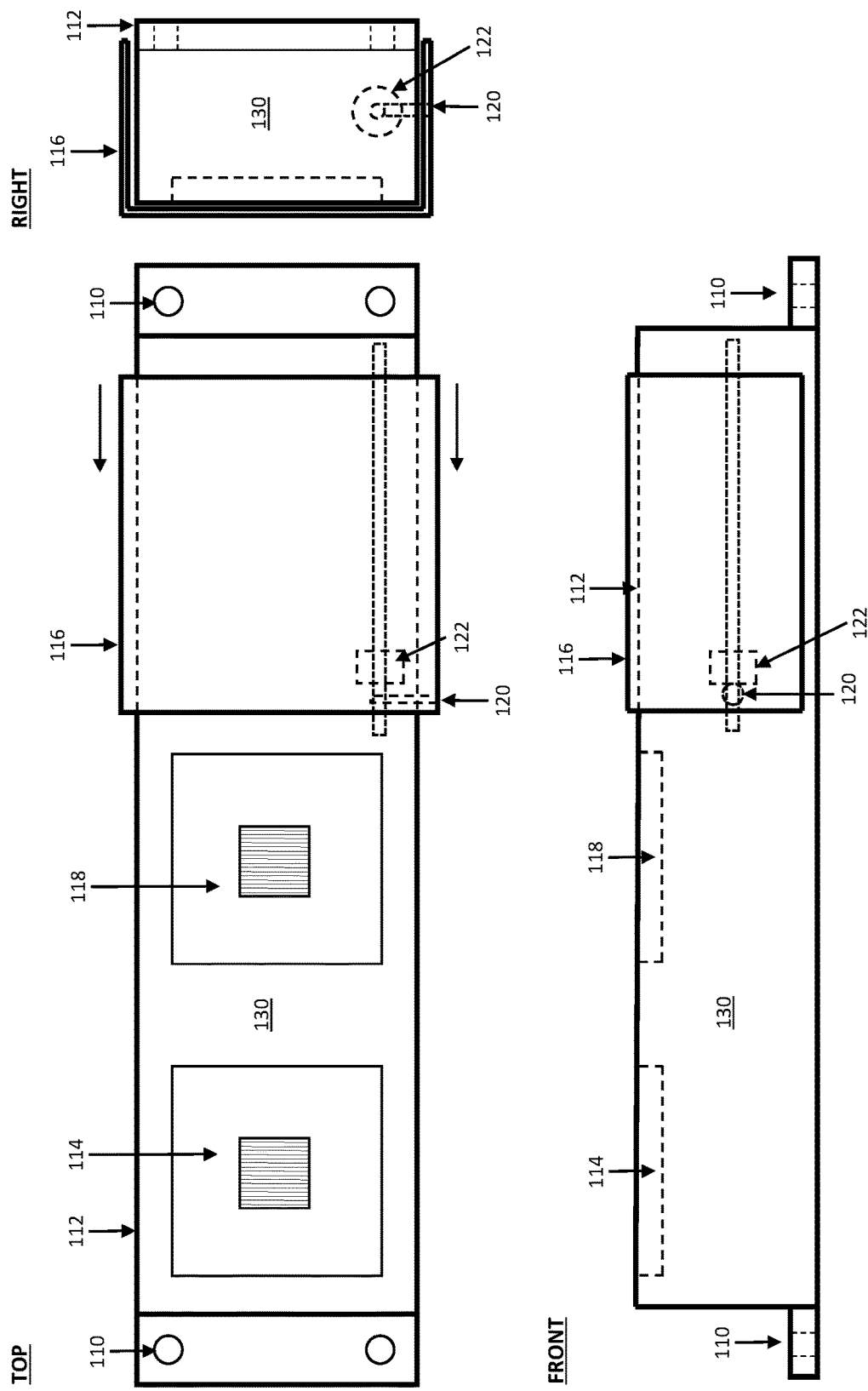
FIG. 2 depicts the soiling sensor head (130) of the embodiment of FIG. 1, in a configuration in which the movable cover (116) is open, allowing light to reach the clean PV device (118) for measurement.

FIG. 1 and FIG. 2 depict the soiling sensor head (130). The soiling sensor head (130) comprises a clean PV device (118) and a soiled PV device (114) housed in the sensor head enclosure (112), which can be mounted using mounting holes (110). The clean PV device (118) and soiled PV device (114) each comprise a PV cell encapsulated under glass. The soiling sensor head (130) further comprises a movable cover (116). An actuator (122), such as a solenoid or motor, operates a mechanical linkage (120) attached to the movable cover (116) to move the cover between two positions. In the normal position, depicted in FIG. 1, the movable cover (116) covers the clean PV device (118) and protects it from soiling. Periodically a measurement and control system (320) in the measurement and control enclosure (306) causes the actuator (122) to move the movable cover (116) into the open position depicted in FIG. 2, in which the clean PV device is exposed. However, the measurement and control system (320) exposes the clean PV device (118) only for short intervals, for example 2 to 10 seconds once every 1 to 10 minutes, such that the exposure of the clean PV device (118) to soiling is minimized as compared to the soiled PV device (114) which is left continuously exposed. When the clean PV device (118) is exposed, the measurement and control system (320) measures the electrical output of both the soiled PV device (114) and the clean PV device (118), compares the two readings to determine the degree of soiling obscuring the soiled PV device (114), and records the measured data.

In one embodiment the parameter of electrical output of the soiled PV device (114) and clean PV device (118) measured by the measurement and control system (320) is the short-circuit current.

In one embodiment, the soiling sensor head (130) further comprises temperature sensors which measure the temperature of the clean PV device (118) and/or the soiled PV device (114), and the measurement and control system (320) uses the temperature readings to temperature-compensate the electrical readings of the clean PV device (118) and/or the soiled PV device (114).

In one embodiment, the measurement and control system (320) determines a soiling impact analysis by calculating a soiling ratio equal to the short-circuit current of the soiled PV device (114) divided by the short-circuit current of the clean PV device (118) and multiplied by a normalization constant, where the normalization constant is chosen so that when both the soiled PV device (114) and the clean PV device (118) are clean, the soiling ratio is unity. In one embodiment, the measurement and control system calculates a soiling loss factor equal to one minus the soiling ratio.

Figure 3:
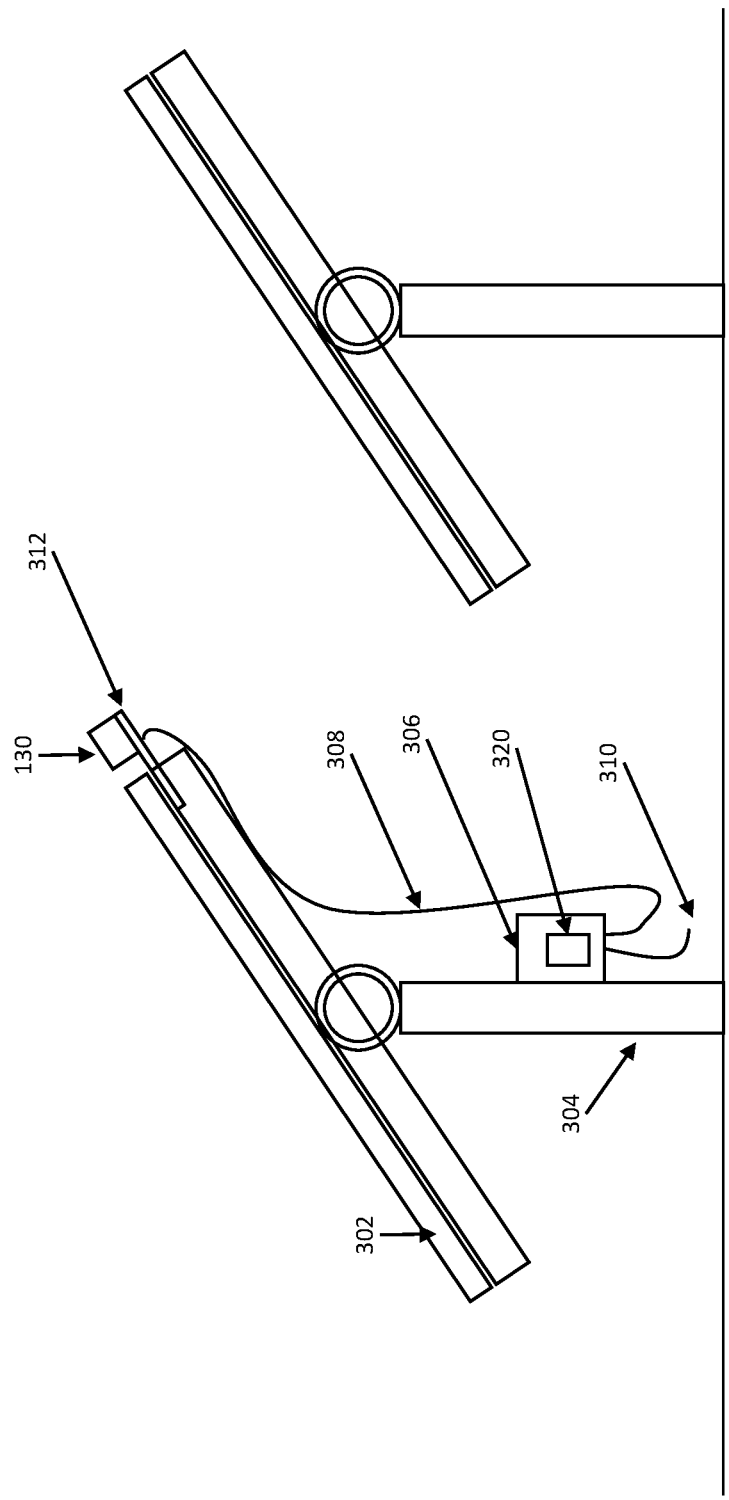
FIG. 3 depicts the soiling sensor head (130) of the embodiment of FIG. 1 mounted on a PV array comprising PV modules (302) mounted on a rack system (304), together with a measurement and control enclosure (306) for the soiling measurement device.

FIG. 3 depicts the installation of the soiling measurement device in a PV array, comprising PV modules (302) mounted on a rack structure (304) which may be a single-axis tracking system designed to tilt the PV modules (302) to follow the sun throughout the day. The soiling sensor head (130) is mounted to the rack structure (304) with brackets (312) (using the mounting holes (110)). The measurement and control system (320) is housed in the measurement and control enclosure (306) which would typically be mounted to the rack structure (304). Power and signals are transmitted between the measurement and control enclosure (306) and the soiling sensor head via a measurement and control cable (308). Power and signals, including measurement results, are transmitted between the user's site facilities and the measurement and control enclosure (306) via power and signal wiring (310). Measurement results are communicated over the power and signal wiring (310) using any of a number of common industrial communication protocols.

In one embodiment, the measurement and control system (320) causes measurements to be performed or analyzed only during a limited time interval during the day when the solar angle of incidence on the soiling sensor head (130) is small, in order to minimize the effect of any angular alignment differences between the clean PV device (118) and the soiled PV device (114) on the ratio of light received by the clean PV device (118) and soiled PV device (114). For example, when the soiling sensor head (130) is to be mounted on a rack for a fixed-tilt PV array, measurements may be limited to a time period of a few hours surrounding local solar noon. Alternatively when the soiling sensor head (130) is to be mounted on a single-axis tracking PV array rack, measurements may be limited to time periods when the solar angle of incidence is less than a pre-determined value, for example 35 degrees. The limitation of measurements to a specific time window when the measurements are most accurate further minimizes the exposure of the clean PV device (118) to potential soiling.

In one embodiment, the measurement and control system (320) periodically measures the electrical output of the soiled PV device (114) to approximately determine the solar irradiance (e.g. from measured short-circuit current) and causes the movable cover (116) to retract to expose the clean PV device (118) only when the approximate solar irradiance detected by the soiled PV device (114) is in a range that indicates stable sunny conditions suitable for measurement, thus further protecting the clean PV device (118). In one embodiment, the measurement and control system (320) additionally monitors the rate of change of the electrical output of the soiled PV device (114) in order to better determine stable conditions suitable for measurement by excluding conditions during which the rate of change of the electrical output is too high, e.g. corresponding to the passage of clouds overhead.

In one embodiment, the measurement and control system (320) provides instantaneous results of each reading performed.

In one embodiment, the measurement and control system (320) averages the readings over the course of each day, in order to provide a single result characteristic of the day. In one embodiment, the measurement and control system (320) filters the data prior to analysis, selecting only data meeting pre-determined quality criteria or measured during particular time intervals, prior to averaging to determine the single result characteristic of the day. In one embodiment, the averaging of individual readings is performed as a weighted average where the weighting factor is the solar irradiance determined from the clean PV device (118).

In one embodiment, the measurement and control system (320) logs the results over an extended period, including days, weeks, months, or years.

In one embodiment, a spring (not shown), causes the movable cover (116) to return to the closed position whenever power is removed from the soiling sensor head (130).

In one embodiment, the movable cover (116) may be opened manually without activating the actuator (122), for example through the operation of a hinge, so that a technician can inspect and/or clean the clean PV device (118), the movable cover (116), the sensor head enclosure (112), or other parts of the soiling sensor head (130).

In one embodiment, the soiling sensor head (130) further comprises a moisture sensor (not shown). In one embodiment, the measurement and control system (320) keep the movable cover (116) closed when rain is detected via the moisture sensor, in order to prevent soiling of the clean PV device (118); in another embodiment, the measurement and control system (320) open the movable cover (116) when rain is detected via the moisture sensor, in order to take advantage of the rain to clean any soiling which may have accumulated on the clean PV device (118).

In one embodiment, the soiling sensor head (130) further comprises limit sensors (not shown) which detect whether the movable cover (116) is open or closed. In one embodiment, the limit sensors are used by the measurement and control system (320) to issue alerts to the user that the soiling sensor head (130) requires maintenance.

In one embodiment, the measurement and control system (320) detects whether the movable cover (116) is open or closed by the electrical signal received from the clean PV device (118) in comparison to expectations based on time of day and/or electrical signal received from the soiled PV device (114). In one embodiment the measurement and control system (320) issues alerts to the user that the soiling sensor head (130) requires measurement when the movable cover (116) is detected in the incorrect position.

In one embodiment, the soiling measurement device is installed on a ground-mounted PV array at a PV power plant, as depicted in FIG. 3. In another embodiment, the soiling measurement device is mounted on a roof-top mounted PV array.

In one embodiment, the soiled PV device (114) and the clean PV device (118) are housed in separate enclosures, which may be mounted either next to each other or farther apart.

In one embodiment, the soiled PV device (114) and/or the clean PV device (118) comprise PV modules, which are combinations of PV cells in series and/or parallel, rather than individual cells.

In one embodiment, the soiling measurement device contains an input to which an external PV device, such as a PV module, may be connected, thus making the external PV device the soiled PV device (114).

In one embodiment, the measurement and control system (320) is integrated within the sensor head enclosure (112) and the separate measurement and control system enclosure (306) is eliminated.

In one embodiment, the measurement and control system (320) uses measurements of the clean PV device (118) to determine incident solar irradiance. In one embodiment, the soiled PV device (114) is omitted. In this embodiment, the sole function is to measure solar irradiance with the clean PV device (118).

In addition to the above described embodiments, those skilled in the art will appreciate that this disclosure has application in a variety of arts and situations and this disclosure is intended to include the same.

All references, including publications, patent applications, and patents, cited herein are hereby incorporated by reference to the same extent as if each reference were individually and specifically indicated to be incorporated by reference and were set forth in its entirety herein.

The invention claimed is:

1. A soiling measurement device comprising a clean PV device and a soiled PV device, wherein the soiled PV device is exposed to accumulate soiling, and wherein the clean PV device is maintained clean by a movable cover which normally shields it from accumulation of soiling, and wherein the movable cover opens automatically at periodic intervals for measurements, after which it closes again, and wherein a measurement and control system measures electrical outputs of said clean PV device and said soiled PV device, wherein said electrical outputs comprise at least a short-circuit current of said clean PV device and a short-circuit current of said soiled PV device, and wherein said measurement and control system determines a soiling impact analysis by calculating at least a soiling ratio equal to said short-circuit current of said soiled PV device divided by said short-circuit current of said clean PV device multiplied by a normalization constant chosen so that when both said soiled PV device and said clean PV device are clean, said soiling ratio is unity.

2. The device of claim 1, wherein said clean PV device and said soiled PV device each comprise a PV cell.

3. The device of claim 1, further comprising at least one temperature sensor to measure a temperature of said clean PV device and/or said soiled PV device, and wherein measurements of said temperature are used to temperature-correct electrical measurements of said clean PV device and/or said soiled PV device.

4. The device of claim 1, wherein said measurement and control system causes said measurements to be performed or analyzed only during a limited time interval during the day when a solar angle of incidence on the device is less than a pre-determined value.

5. The device of claim 1, wherein said measurement and control system causes said measurements to be performed or analyzed only during a time period from three hours before to three hours after local solar noon.

6. The device of claim 1, wherein said measurement and control system causes said measurements to be performed or analyzed only when said electrical output of said soiled PV device is within a pre-determined range.

7. The device of claim 1, wherein said measurement and control system causes said measurements to be performed or analyzed only when a rate of change of said electrical output of said soiled PV device is within a pre-determined range.

8. The device of claim 1, wherein said measurement and control system averages said measurements over the course of a day to provide a single result characteristic of the day, wherein said averaging is performed either directly or as an irradiance-weighted average.

9. The device of claim 1, wherein said movable cover automatically retracts to a closed position whenever power is removed.

10. The device of claim 1, wherein said movable cover may be opened manually without operation of an actuator.

11. The device of claim 1, wherein said soiled PV device is a PV module.

12. The device of claim 1, wherein said soiled PV device is housed in a separate enclosure from said clean PV device.

13. The device of claim 1, wherein said measurement and control system and said clean PV device are housed in a single enclosure.

* * * * *